US011032372B1

(12) United States Patent
Wittevrongel

(10) Patent No.: US 11,032,372 B1
(45) Date of Patent: Jun. 8, 2021

(54) EFFICIENT DATA STREAMING USING A GLOBAL INDEX

(71) Applicant: Lytx, Inc., San Diego, CA (US)

(72) Inventor: Jeremiah Todd Wittevrongel, San Diego, CA (US)

(73) Assignee: Lytx. Inc., San Diego, CA (US)

( * ) Notice: Subject to any disclaimer, the term of this patent is extended or adjusted under 35 U.S.C. 154(b) by 0 days.

(21) Appl. No.: 16/600,818

(22) Filed: Oct. 14, 2019

(51) Int. Cl.
*G06F 15/16* (2006.01)
*H04L 29/08* (2006.01)
*G07C 5/00* (2006.01)
*G07C 5/08* (2006.01)

(52) U.S. Cl.
CPC .......... *H04L 67/1097* (2013.01); *G07C 5/008* (2013.01); *G07C 5/085* (2013.01); *H04L 67/12* (2013.01)

(58) Field of Classification Search
CPC ..... H04L 67/1097; H04L 67/12; G07C 5/008; G07C 5/085
USPC .......................................................... 709/217
See application file for complete search history.

(56) References Cited

U.S. PATENT DOCUMENTS 8,139,820 B2 * 3/2012 Plante .................... G07C 5/008
382/104
8,239,092 B2 * 8/2012 Plante .................. G07C 5/0866
701/32.2
8,989,959 B2 * 3/2015 Plante ................... B60W 40/08
701/33.4
9,373,257 B2 * 6/2016 Bonhomme ......... G08G 1/0112
10,109,185 B1 * 10/2018 Dubois, Jr. .......... G08G 1/0133
10,255,528 B1 * 4/2019 Nguyen ................ B60W 30/12
10,431,089 B1 * 10/2019 Nguyen ................... B60Q 9/00
10,572,542 B1 * 2/2020 Conner ............. G06F 16/90335
10,664,707 B2 * 5/2020 Hannah .................. G08G 1/202
10,855,743 B1 * 12/2020 Wittevrongel .......... H04L 12/14
2008/0147267 A1 * 6/2008 Plante .................... G07C 5/008
701/33.4

* cited by examiner

*Primary Examiner* — Alicia Baturay
(74) *Attorney, Agent, or Firm* — Van Pelt, Yi & James LLP

(57) ABSTRACT

A system for data access comprises a server storage system, a global index, an interface, and a processor. The server storage system stores data associated with vehicle event recorders. The global index includes indications of server-stored data stored on the server storage system. The interface is configured to receive an access indication to access desired data. The processor is configured to determine a server stored portion of the desired data associated with the vehicle event recorder that has been previously stored on the server storage system using information stored in the global index and retrieve the server stored portion of the data from the server storage system; and determine a non-server stored portion of the desired data associated with the vehicle event recorder that has not been previously stored on the server storage system and indicate to retrieve the non-server stored portion of the data from the vehicle event recorder.

20 Claims, 14 Drawing Sheets

810
Start
Look Up The Desired Data Using Information In A Global Index To Determine The Non-Server Stored Portion Of The Desired Data
812
Any Desired Data Found?
No → 814 Provide An Indication To Retrieve The Desired Data From The Vehicle Event Recorder → End
Yes
816
Look Up The Desired Data Using Information In A Client Index To Determine The Server Stored Portion Of The Desired Data
818
Any Desired Data Found?
No → 814
Yes
820
Any Desired Data Not Found?
No → 822 Indicate That The Non-Server Stored Portion Of The Desired Data Comprises No Data → End
Yes
824 Determine The Non-Server Stored Portion Of The Desired Data Comprising The Portion Of The Desired Data Not Found
826 Provide An Indication To Retrieve The Non-Server Stored Portion Of The Desired Data From The Vehicle Event Recorder
End

EFFICIENT DATA STREAMING USING A GLOBAL INDEX

BACKGROUND OF THE INVENTION

Modern vehicles (e.g., airplanes, boats, trains, cars, trucks, etc.) can include a vehicle event recorder in order to better understand the timeline of an anomalous event (e.g., an accident). A vehicle event recorder typically includes a set of sensors, e.g., video recorders, audio recorders, accelerometers, gyroscopes, vehicle state sensors, global positioning systems (GPS), etc., that report data, which is used to determine the occurrence of an anomalous event. Some of the data is eventually transferred to a vehicle data center for review by a reviewer. Data can be transferred for a plurality of reasons, for example, for review by a driver coach or manager, for research purposes, for collection of driver statistics, etc. Transferring data from a vehicle event recorder to a vehicle data center is expensive, in some cases requiring data transfer over a cellular network. This creates a problem wherein minimizing total data transfer is desirable.

BRIEF DESCRIPTION OF THE DRAWINGS

Various embodiments of the invention are disclosed in the following detailed description and the accompanying drawings.

DETAILED DESCRIPTION

Figure 1:
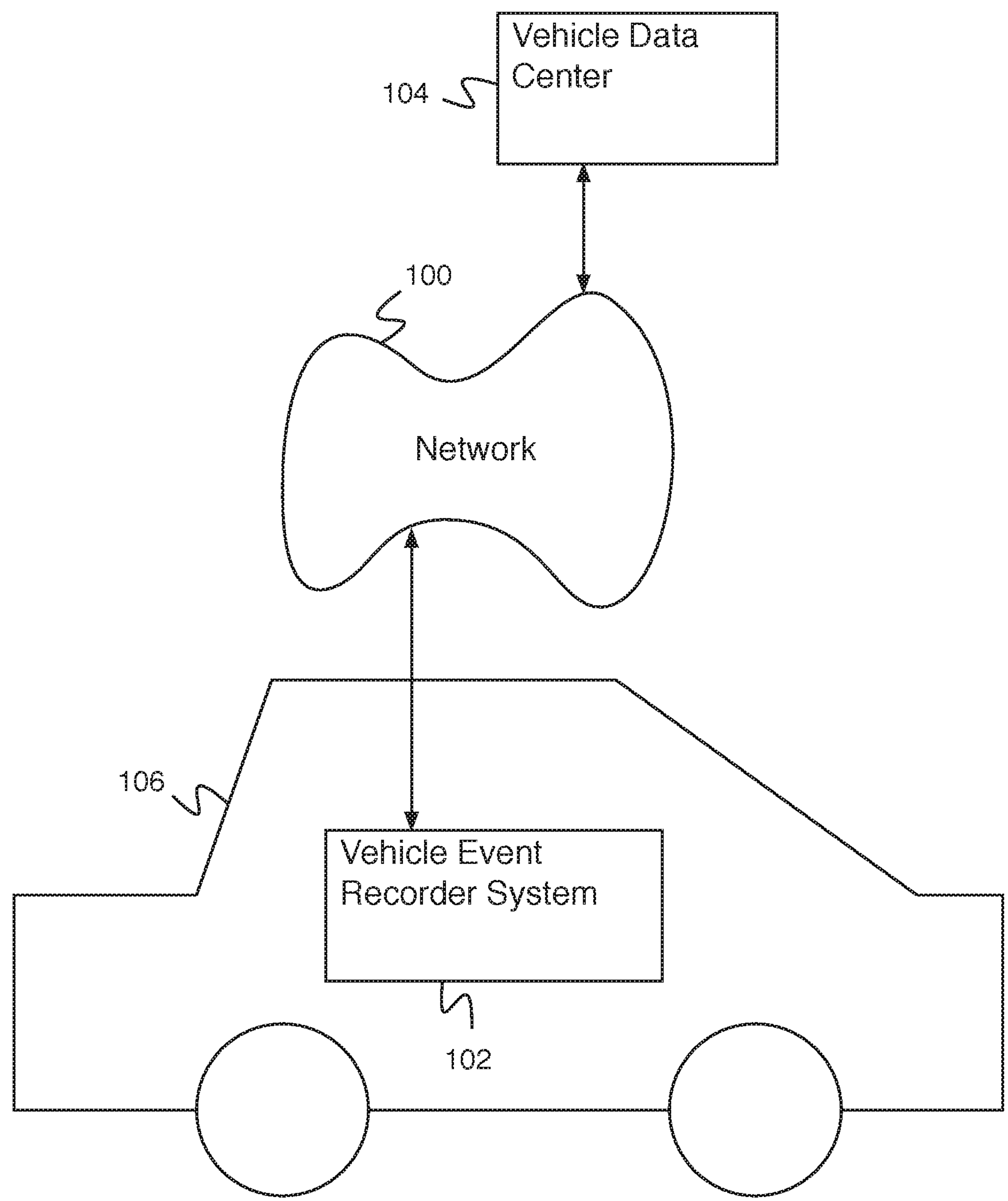
FIG. 1 is a block diagram illustrating an embodiment of a system including a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term ‘processor’ refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for data access is disclosed. The system comprises a server storage system, a global index, an interface, and a processor. The server storage system stores data associated with a plurality of vehicle event recorders. The global index includes indications of server-stored data stored on the server storage system and corresponding client information, wherein the client information includes an associated indication that the stored data is associated with a client of a plurality of clients. The interface is configured to receive an access indication to access desired data associated with a vehicle event recorder of the plurality of vehicle event recorders, wherein the vehicle event recorder is associated with a specific client. The processor is configured to determine a server stored portion of the desired data associated with the vehicle event recorder that has been previously stored on the server storage system using information stored in the global index; to retrieve the server stored portion of the data from the server storage system; to determine a non-server stored portion of the desired data associated with the vehicle event recorder that has not been previously stored on the server storage system; and to indicate to retrieve the non-server stored portion of the data from the vehicle event recorder.

A system for data access comprises a vehicle data center in communication with one or more vehicle event recorders. For example, the vehicle data center comprises a user station for use by a user to view data, analyze data, process data, request data, etc. Data is stored in a server storage system of the vehicle data center (e.g., a server system at the vehicle data center, a server system at another location, a server system in the cloud, a plurality of server systems, etc.) and is accessible by the user. Metadata associated with stored data is stored in a global index system. For example, metadata comprises a vehicle event recorder identifier, a vehicle identifier, a sensor type, a data start time, a data stop time, a data sampling rate, a data duration, a driver identifier, a location identifier, a route identifier, a client identifier, etc. Data can be requested by one of a plurality of users—for example, a driver, a driver manager, a driver coach, vehicle event recorder system staff, a vehicle event recorder system administrator, a vehicle event recorder system researcher, etc. Data is transferred for one or more of a variety of purposes—for example, livestreaming, data analysis, collection of statistics, driver review, system research, etc. Regardless of the data type, the requesting user, or the purpose, the data is stored in the server storage system and indexed in the global index system. In the event the data is requested a second time, it is identified as having already been collected using the global index system and retrieved from the server storage system. Even when the data is requested by a different user or user type and/or for a different purpose it does not need to be transferred a second time. In the event a server stored portion of the requested data is stored on the server storage system and a non-server stored portion of the requested data is not stored on the server storage system, the non-server stored portion of the requested data is determined using the global index system and only the non-server stored portion is transferred. For example, a non-server stored data portion comprises a period of time when data was not transferred, a sensor from which data was not transferred, a set of data samples which were not transferred (e.g., data was previously transferred at a lower resolution and was then requested at a higher resolution, requiring transfer of additional samples), etc.

The system retrieves data from the vehicle event recorder system by 1) the vehicle data center system indicating to retrieve the desired data; 2) providing a request from the vehicle data center system (e.g., a processor of the data center system via an interface of the data center system to a network—for example, a cellular network, a wireless network, a wifi network, the internet, etc.) to the appropriate vehicle event recorder to provide the desired data; 3) the vehicle event recorder receiving the request and locating the desired data; and 4) the vehicle event recorder providing the desired data to the vehicle data center.

The system for data access improves the computer (e.g., the vehicle data center computer and/or processor system) by eliminating duplicated data transfers and thereby reducing the total quantity of data transferred (e.g., more efficient use of bandwidth) and its associated cost.

FIG. 1 is a block diagram illustrating an embodiment of a system including a vehicle event recorder. In the example shown, vehicle event recorder system 102 comprises a vehicle event recorder mounted in a vehicle (e.g., a car, a truck, a trailer associated with a semi truck, a van, a bus, a commercial vehicle, etc.). Vehicle event recorder system 102 comprises a vehicle event recorder and sensor systems. The sensor systems comprise a set of sensors—for example, one or more video recorders, audio recorders, accelerometers, gyroscopes, vehicle sensors, proximity sensors, a global positioning system (GPS), outdoor temperature sensors, moisture sensors, laser line tracker sensors, sound navigation and ranging systems (SONAR), light detection and ranging systems (LIDAR), range finder sensors, etc. Vehicle sensors comprise internal vehicle sensors—for example a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, traction control system sensors, drive wheel speed sensors, shocks sensors, an engine exhaust sensor, a gear position sensor, a cabin equipment operation sensor, etc. The vehicle event recorder comprises a system for receiving, storing, and/or processing sensor data. In some embodiments, the vehicle event recorder captures data (e.g., collects data, stores received data, etc.) in response to a trigger—for example, a trigger associated with a trigger threshold. Capturing data in response to a trigger comprises receiving data, processing the data, determining to capture more data (e.g., by determining that a processed data value is greater than a threshold), and capturing the more data. In some embodiments, the sensor data is captured and stored continuously and triggers are stored as pointers into the data to identify possible events of interest for review at a later time.

Processing sensor data comprises filtering data, identifying patterns in data, detecting events, etc. Vehicle event recorder system 102 is mounted on vehicle 106 in any appropriate location—for example the chassis, the front grill, the dashboard, the rear-view mirror, the rear window or wall, the floor, etc. There are times when vehicle event recorder system 102 comprises multiple units mounted in different locations within vehicle 106 instead of a single unit, particularly when there are space constraints for a given location (e.g., behind the rear view mirror) and more space is required to house electronic components. Vehicle event recorder system 102 comprises a communications system for communicating with network 100. Network 100 comprises a network for communications. Network 100 comprises one or more of a wireless network, a wired network, a cellular network, a Code Division Multiple Access (CDMA) network, a Global System for Mobile Communication (GSM) network, a Long-Term Evolution (LTE) network, a Universal Mobile Telecommunications System (UMTS) network, a Worldwide Interoperability for Microwave Access (WiMAX) network, a Dedicated Short-Range Communications (DSRC) network, a local area network, a wide area network, the Internet, etc. There are instances when network 100 comprises multiple networks, for instance, multiple interconnected networks spanning different regions, networks operating at different times, overlaid networks with different access permissions, networks with different bandwidth, etc. Different networks comprising network 100 typically comprise different bandwidth cost (e.g., a wired network has a very low cost, a wireless Ethernet connection has a moderate cost, a cellular data network has a high cost, etc.). In some embodiments, network 100 has a different cost at different times (e.g., a higher cost during the day and a lower cost at night). Vehicle event recorder system 102 communicates with vehicle data center 104 via network 100. Vehicle data center 104 receives data, processes data, stores data, requests more data, provides stored data, provides data for viewing to a user, etc.

For example, vehicle data center 104 comprises a server storage system, wherein the server storage system stores data associated with a plurality of vehicle event recorders, a global index, wherein the global index includes indications of stored data stored on the server storage system and corresponding client information, wherein the client information includes an indication that the stored data is associated with a client of a plurality of clients, an interface configured to receive an indication to access desired data associated with a vehicle event recorder of the plurality of vehicle event recorders, wherein the vehicle event recorder is associated with a specific client, and a processor configured to determine a server stored portion of the desired data associated with the vehicle event recorder that has been previously stored on the server storage system using information stored in the global index and retrieve the server stored portion of the data from the server storage system and determine a non-server stored portion of the desired data associated with the vehicle event recorder that has not been previously stored on the server storage system and indicate to retrieve the non-server stored portion of the data from the vehicle event recorder.

Figure 2:
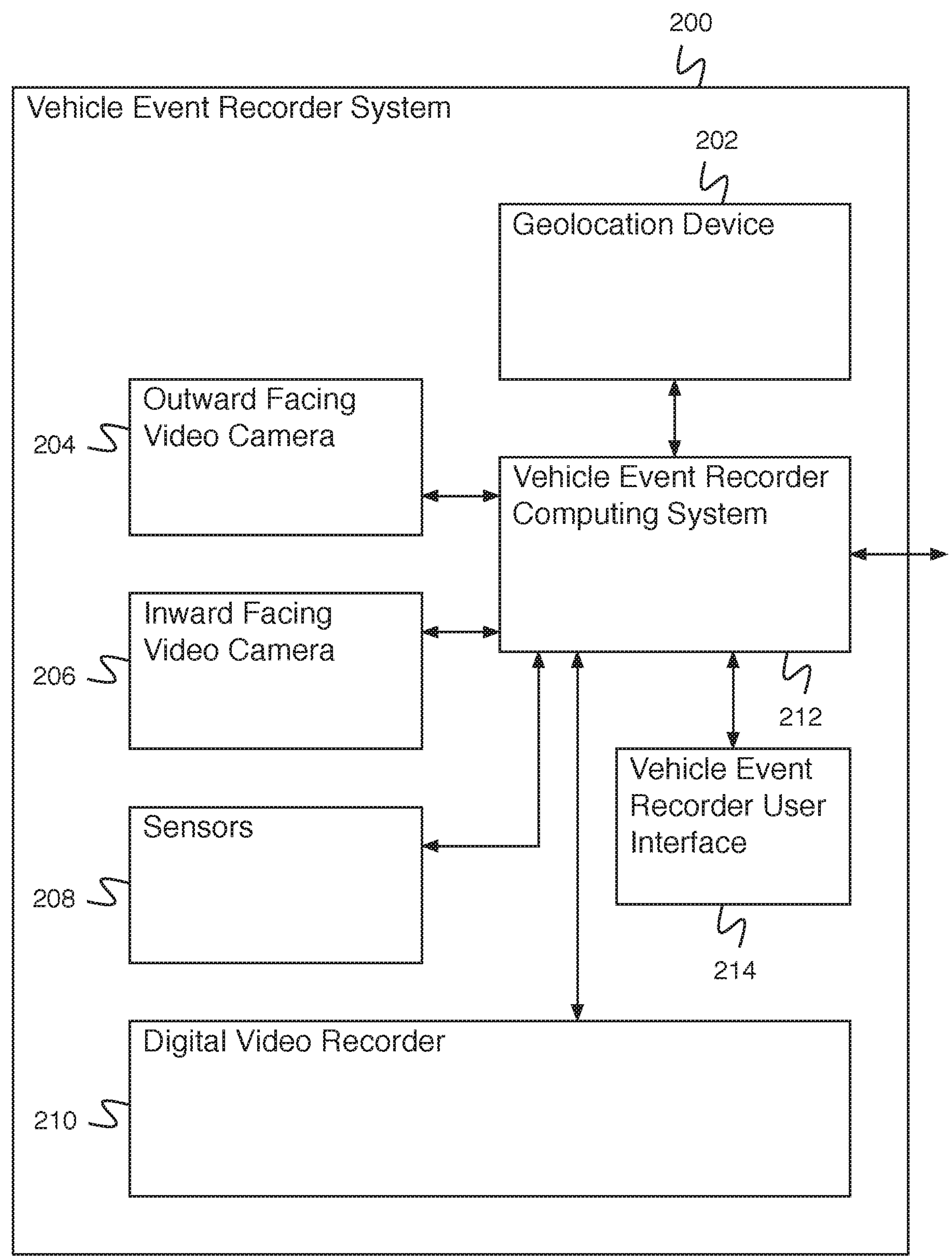
FIG. 2 is a block diagram illustrating an embodiment of a vehicle event recorder system.

FIG. 2 is a block diagram illustrating an embodiment of a vehicle event recorder system. In some embodiments, vehicle event recorder system 200 comprises vehicle event recorder system 102 of FIG. 1. In the example shown, vehicle event recorder system 200 comprises vehicle event recorder computing system 212 (e.g., a computing system for receiving data, processing data, providing interface data, communicating via a network, etc.). Vehicle event recorder system 200 additionally comprises geolocation device 202. For example, geolocation device 202 comprises a GPS device. Vehicle event recorder system 200 additionally comprises outward facing video camera 204 and inward facing video camera 206. For example, outward facing video camera 204 comprises a video camera facing the road ahead of the vehicle, and inward facing video camera 206 comprises a video camera facing the driver. In various embodiments, vehicle event recorder system 200 additionally comprises a video camera facing the road behind the vehicle, a video camera facing out the left or right side of the vehicle, a video camera facing the passenger, etc. Vehicle event recorder system 200 additionally comprises sensors 208. Sensors 208 comprise audio recorders, accelerometers, gyroscopes, vehicle sensors, proximity sensors, outdoor temperature sensors, moisture sensors, laser line tracker sensors, SONAR, LIDAR, range finder sensors, etc. Vehicle event recorder computing system 212 is connected to vehicle sensors using a bus, where vehicle sensors may comprise internal vehicle sensors—for example, a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, traction control system sensors, drive wheel speed sensors, shocks sensors, an engine exhaust sensor, a gear position sensor, a cabin equipment operation sensor, etc. Vehicle event recorder system 200 additionally comprises digital video recorder 210. Digital video recorder 210 comprises a digital video recorder for recording digital video data and/or sensor data from vehicle event recorder sensors and/or vehicle sensors. For example, digital video recorder 210 comprises a large capacity digital storage device for recording as much digital video data as is desired—for example, continuous digital video data received from outward facing video camera 204, inward facing video camera 206, and/or any other appropriate video camera or cameras, for a period of time comprising hours, days, weeks, etc. Vehicle event recorder user interface comprises an interface to vehicle event recorder system 200. For example, vehicle event recorder user interface 214 comprises one or more indicator lights for indicating digital video recorder (DVR) recording disabled or event detection disabled, a map display for showing a current map location, a current map region, a recording or event detection status, for receiving an indication of a map region, etc.

Figure 3:
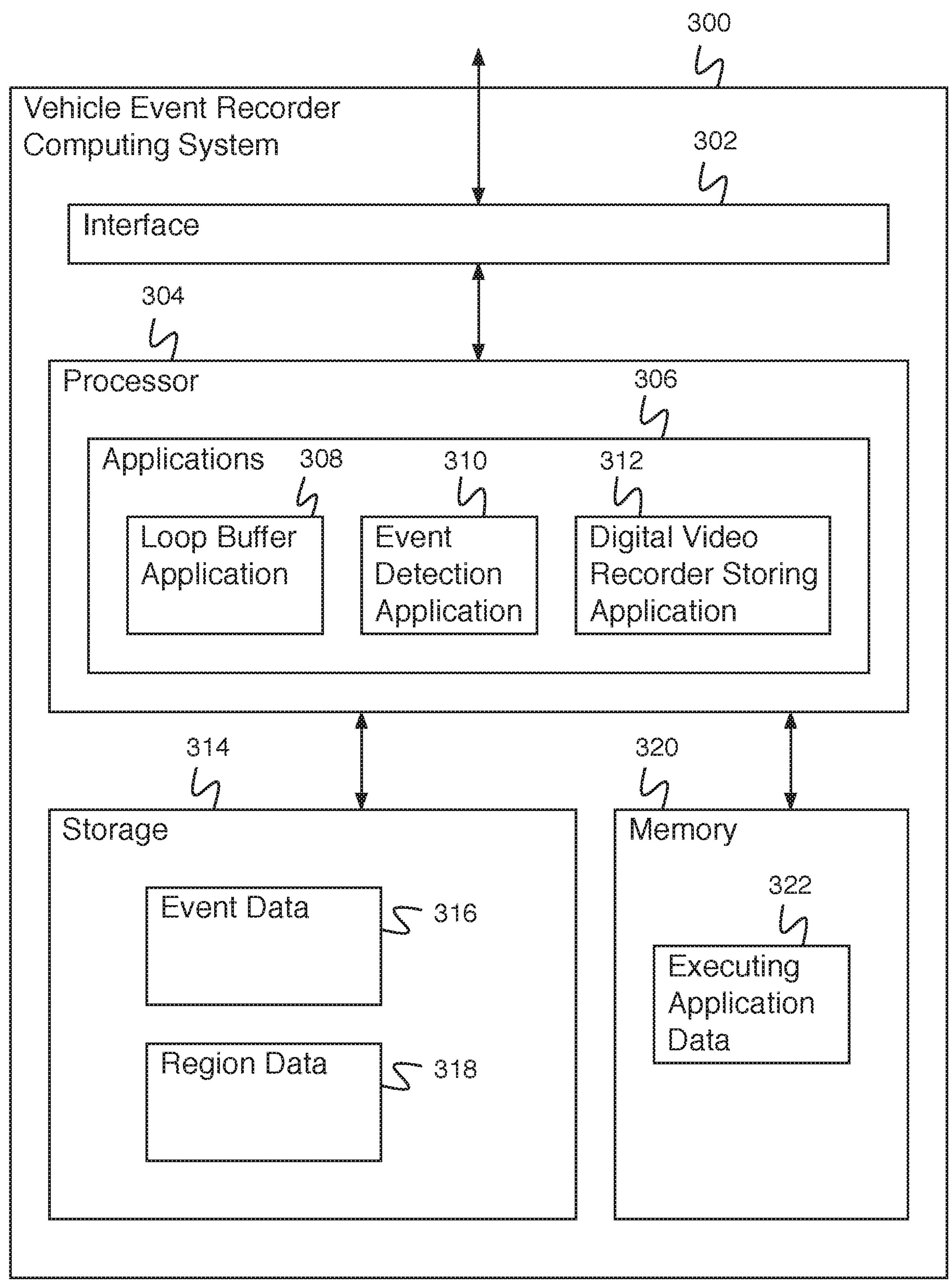
FIG. 3 is a block diagram illustrating an embodiment of a vehicle event recorder.

FIG. 3 is a block diagram illustrating an embodiment of a vehicle event recorder. In some embodiments, vehicle event recorder 300 comprises vehicle event recorder computing system 212 of FIG. 2. In the example shown, vehicle event recorder 300 comprises interface 302. Interface 302 comprises an interface for communicating with external systems using a network. For example, interface 302 comprises an interface for communicating with other elements of a vehicle recorder system (e.g., for receiving location data from a geolocation device, for receiving video data from an outward facing vehicle camera, for receiving sensor data, for providing an indication to enable or disable DVR storage, for communicating with a user interface, etc.), a vehicle data server (e.g., for providing sensor data, for providing indications of anomalous events,), vehicle sensor systems, etc. Processor 304 comprises a processor for executing applications 306. Applications 306 comprises loop buffer application 308, event detection application 310, and digital video recorder storing application 312. Loop buffer application 308 comprises an application for storing a most recent period of time of video data in a loop buffer (e.g., a data buffer wherein the record point moves through the buffer in a looping pattern). For example, loop buffer application 308 comprises an application for providing a most recent period of time (e.g., 5 seconds, 30 seconds, 5 minutes, etc.) of video at any point in time. Loop buffer data (e.g., the loop buffer) is stored in event data 316 or in executing application data 322. Event detection application 310 comprises an application for analyzing data and determining an occurrence of an anomalous event. Event detection application 310 analyzes video data, audio data, sensor data, etc. In the event that event detection application 310 determines that an anomalous event has occurred, event data associated with the event is stored in event data 316. In some embodiments, anomalous event data is stored as a pointer to video events stored continuously by a digital video recorder. Digital video recorder storing application 312 comprises an application for determining whether to store video data in a digital video recorder. For example, digital video recorder storing application 312 comprises an application for determining a digital video recorder storing state, in response to the digital video recorder storing state being a prohibited state, disabling transfer of video data to the digital video recorder, and in response to the digital video recorder storing state being not the prohibited state, enabling transfer of the video data from the outward facing video camera to the digital video recorder for storage. In some embodiments, processor 304 comprises other applications, including any other appropriate applications (e.g., a data collection application, a data viewing application, a driver health determination application, a data analysis application, etc.). Vehicle event recorder computing system 300 additionally comprises storage 314. Storage 314 comprises event data 316 and region data 318. Event data 316 comprises loop buffer data, sensor data, event data (e.g., an event time, an event location, sensor data indicating an event, an event magnitude, etc.), or any other appropriate data. Region data 318 comprises region data indicating region boundaries and recording rules associated with regions. Vehicle event recorder computing system 300 additionally comprises memory 320. Memory 320 comprises executing application data 322 comprising data associated with applications 306.

Figure 4:
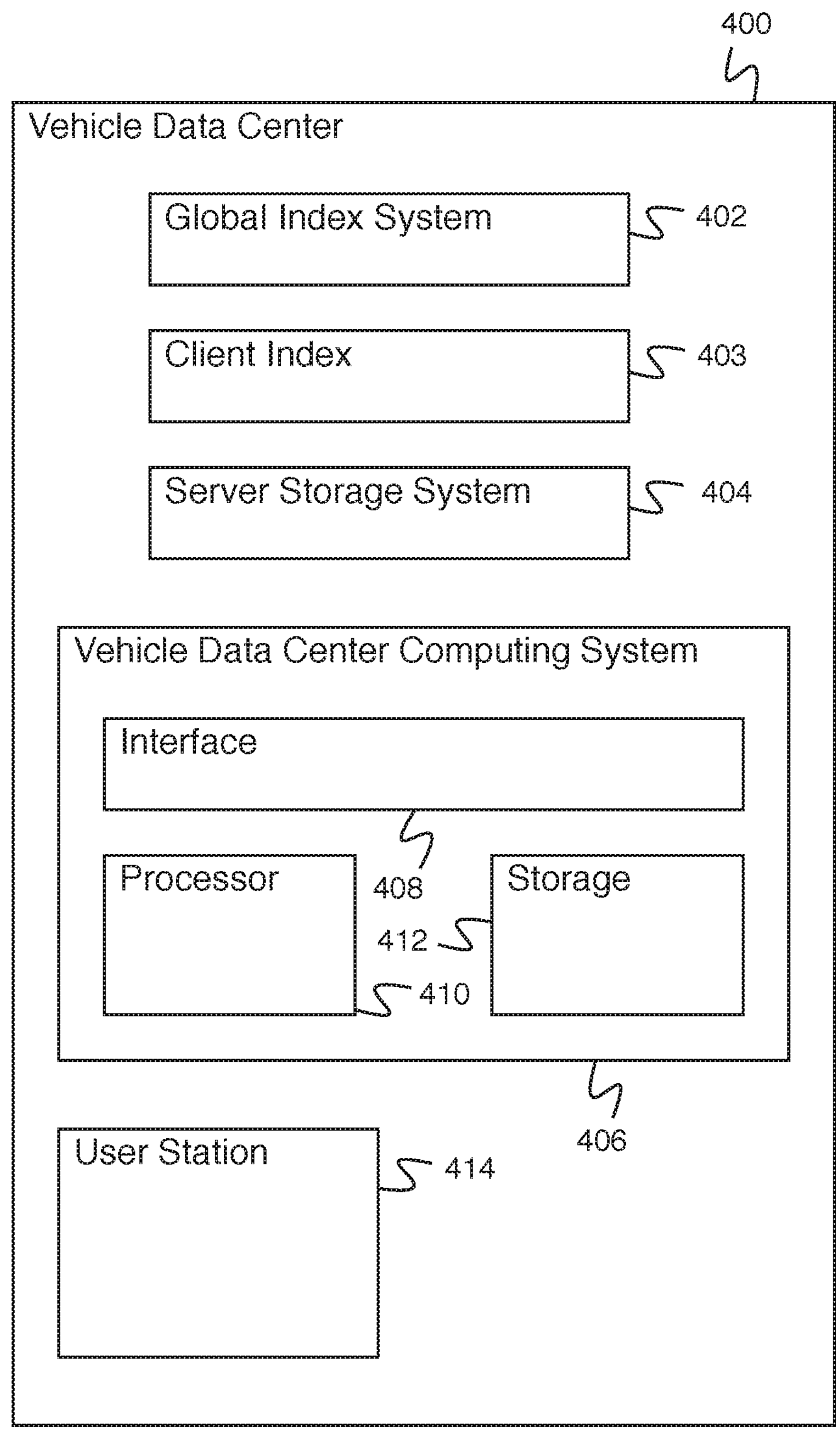
FIG. 4 is a block diagram illustrating an embodiment of a vehicle data center.

FIG. 4 is a block diagram illustrating an embodiment of a vehicle data center. In some embodiments, vehicle data center 400 comprises vehicle data center 104 of FIG. 1. In the example shown, vehicle data center 400 comprises global index system 402, server storage system 404, vehicle data center computing system 406, and user station 414. In various embodiments, the elements of vehicle data center 400 are implemented by a single computing system, the elements of vehicle data center 400 are each implemented by a computing system, the elements of vehicle data center 400 are implemented by two or more computing systems, etc. In the example shown, global index system 402 comprises a system for a global index. For example, global index system 402 comprises a system for storing a global index of transferred data and associated metadata. The global index comprises an index for storing indications of all transferred data (e.g., regardless of associated user, client, requestor, requested purpose, etc.). Client index 403 comprises a plurality of client indices with an index associated with each client, wherein a specific client index includes the subset of the data indications of the global index corresponding to data associated with the client. In some embodiments, one or more client indexes (e.g., each client index associated with a specific client) are part of global index system 402. In various embodiments, data stored on the server storage system comprises starting date and time data, ending date and time data, data length data, data sample rate data, vehicle event recorder identifier data, vehicle identifier data, client identifier data, video data, audio data, accelerometer data, global positioning system data, braking data, ignition status data, On-Board Diagnostic II (OBD-II) fault code data, or any other appropriate data.

Server storage system 404 comprises a storage system for storing data (e.g., data transferred from one or more vehicle event recorders). In various embodiments, server storage system 404 comprises a local database system, a plurality of database systems, a remote database system, a database system in the cloud, or any other appropriate database system. Vehicle data center 400 comprises vehicle data center computing system 406, comprising interface 408, processor 410, and storage 412. For example, interface 408 comprises an interface for receiving transferred data from a vehicle event recorder, for receiving a request for data from a user (e.g., for receiving an access indication to access desired data associated with a vehicle event recorder of a plurality of vehicle event recorders, wherein the vehicle event recorder is associated with a specific client), for providing a query to global index system 402, for receiving query results from global index system 402, for providing data to server storage system 404, for receiving data from server storage system 404, for communicating with a user using user station 414, etc. Processor 410 comprises a processor for processing data, executing applications, etc. For example, processor 410 comprises a processor configured to determine a server stored portion of desired data associated with a vehicle event recorder that has been previously stored on server storage system 404 using information stored in global index system 402 and retrieve the server stored portion of the data from server storage system 404 and determine a non-server stored portion of desired data associated with the vehicle event recorder that has not been previously stored on server storage system 404 and indicate to retrieve the non-server stored portion of the data from the vehicle event recorder. Storage 412 comprises vehicle data center computing system data, for example, vehicle event recorder data, executing application data, program data, user data, configuration data, etc. User station 414 comprises a user station for use by a user. For example, a user uses a user station to view data, livestream data, request data, view a data index, view available data, etc.

Figure 5:
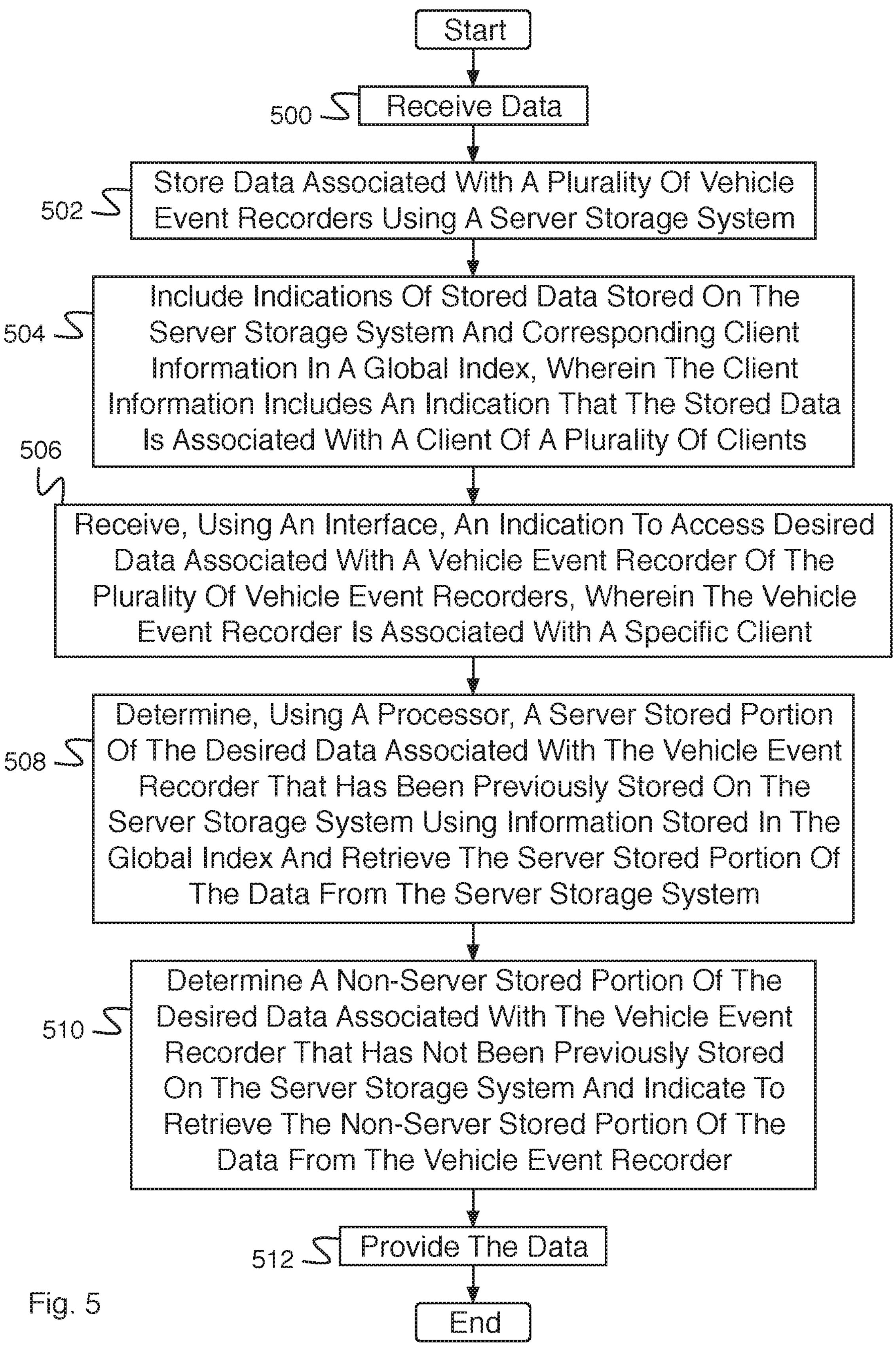
FIG. 5 is a flow diagram illustrating an embodiment of a process for data access.

FIG. 5 is a flow diagram illustrating an embodiment of a process for data access. In some embodiments, the process of FIG. 5 is executed by vehicle data center 104 of FIG. 1. In the example shown, in 500, data is received. For example, data is loaded from a vehicle event recorder. In some embodiments, data is livestreamed or accessed for research purposes. In various embodiments, data comprises video data, audio data, accelerometer data, vehicle sensor data, vehicle event recorder sensor data, or any other appropriate data. In 502, data associated with a plurality of vehicle event recorders is stored using a server storage system. In 504, indications of stored data stored on the server storage system and corresponding client information are included in a global index, wherein the client information includes an indication that the stored data is associated with a client of a plurality of clients. In 506, an indication to access desired data associated with a vehicle event recorder of the plurality of vehicle event recorders is received using an interface, wherein the vehicle event recorder is associated with a specific client. In 508, a server stored portion of the desired data associated with the vehicle event recorder that has been previously stored on the server storage system is determined using information stored in the global index and using a processor, and the server stored portion of the data is retrieved from the server storage system. For example, the global index is searched by searching the global index and then a client index or by searching a client index and then the global index for previously stored portion of the desired data. In 510, a non-server stored portion of the desired data associated with the vehicle event recorder that has not been previously stored on the server storage system is determined, and an indication to retrieve the non-server stored portion of the data from the vehicle event recorder is provided. For example, the non-server stored portion of the desired data is determined using a global index or the non-server stored portion of the desired data is determined using the indication to access the desired data and the determination of the server stored portion of the desired data. In 512, the data is provided. For example, the data is provided in response to access the desired data.

In some embodiments, the determination of 508 and 510 are combined such that determining that the server stored portion of the desired data associated with the vehicle event recorder that has been previously stored using the global index and/or a client index also determines the non-server stored portion of the desired data.

Figure 6:
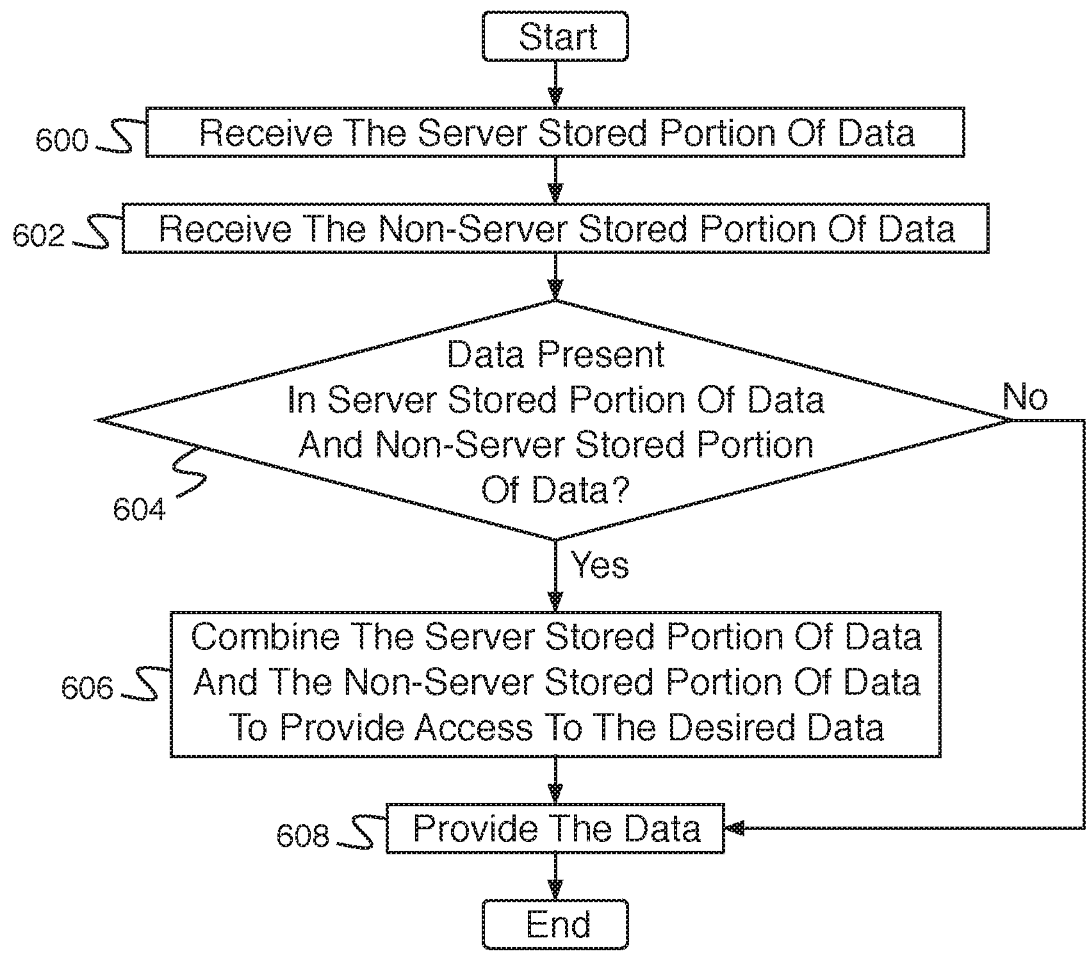
FIG. 6 is a flow diagram illustrating an embodiment of a process for providing the data.

FIG. 6 is a flow diagram illustrating an embodiment of a process for providing the data. In some embodiments, the process of FIG. 6 implements 512 of FIG. 5. In the example shown, in 600, the server stored portion of data is received. In 602, the non-server stored portion of data is received. In 604, it is determined whether data is present in both the server stored portion of data and the non-server stored portion of data. In the event it is determined that data is not present in both the server stored portion of data and the non-server stored portion of data, control passes to 608. In the event it is determined in 604 that data is present in both the server stored portion of data and the non-server stored portion of data, control passes to 606. In 606, the server stored portion of data and the non-server stored portion of data are combined to provide access to the desired data. For example, combining comprises placing data end-to-end (e.g., the server stored portion of data and the non-server stored portion of data comprise data associated with sequential time periods), placing data in parallel tracks (e.g., the server stored portion of data and the non-server stored portion of data comprise left and right audio tracks or simultaneous data associated with different sensors), interleaving data (e.g., the server stored data comprises data at a first sample rate and the requested data comprises data for the same period at a second, higher, sample rate, resulting the non-server stored data comprising a set of interleaved data samples). In 608 the data (e.g., the server stored portion of data in the event data is not present in the non-server stored portion of data; the non-server stored portion of data in the event data is not present in the server stored portion of data; or the combined data) is provided.

Figure 7A:
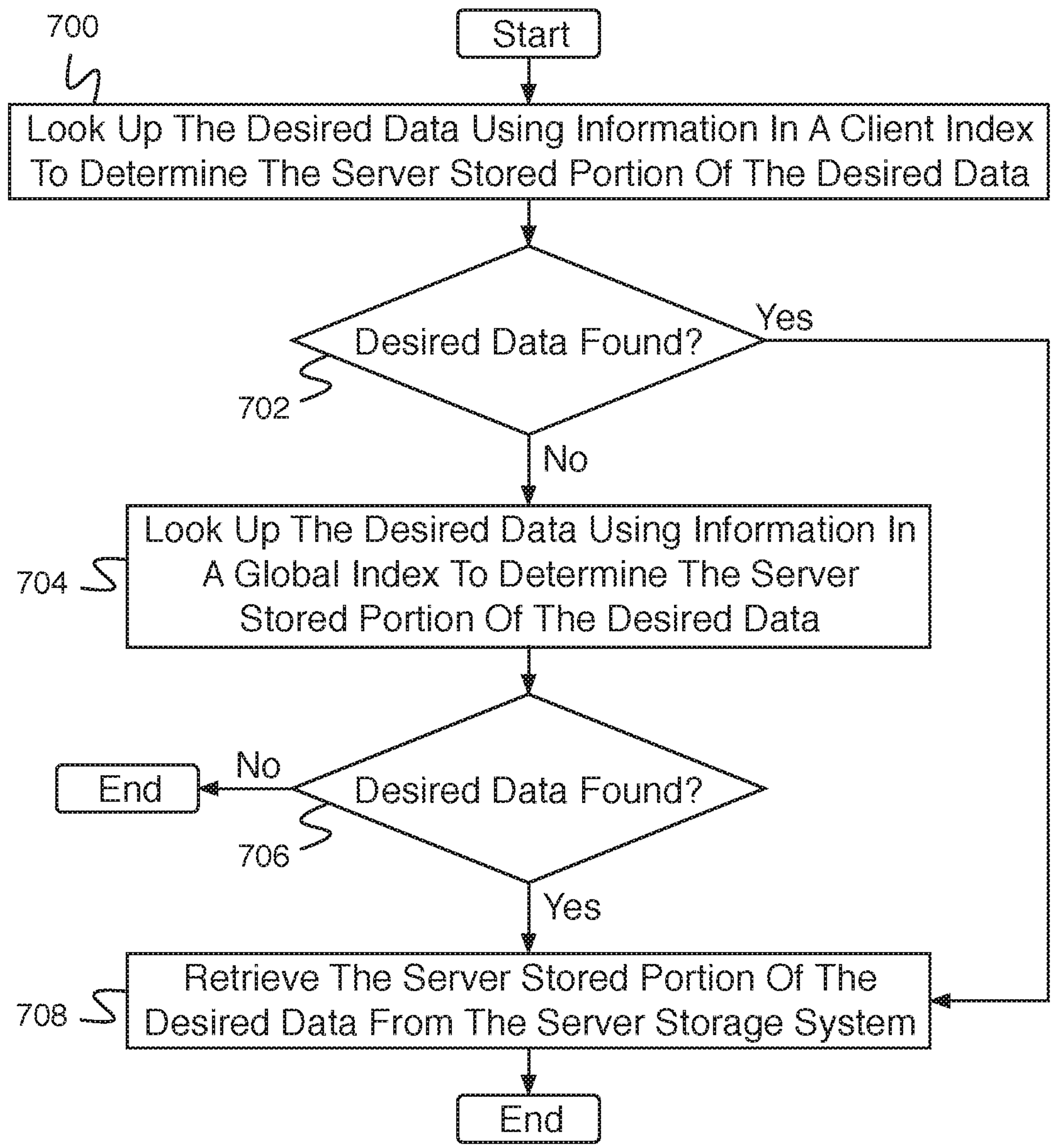
FIG. 7A is a flow diagram illustrating an embodiment of a process for determining a server stored portion of a desired data.

FIG. 7A is a flow diagram illustrating an embodiment of a process for determining a server stored portion of a desired data. In some embodiments, the process of FIG. 7 implements 508 of FIG. 5. In the example shown, in 700, the desired data is looked up using information in a client index to determine the server stored portion of the desired data. For example, the client index comprises all data transferred as a result of requests initiated by users associated with the client. In 702, it is determined whether the desired data was found (e.g., in the client index). In the event desired the data was found, control passes to 708. In the event the desired data was not found, control passes to 704. In 704, the desired data is looked up using information in a global index to determine the server stored portion of the desired data. For example, the global index comprises all transferred data. In 706, it is determined whether the desired data was found (e.g., in the global index). In the event the desired data was not found, the process ends. In the event the desired data was found, control passes to 708. In 708, the server stored portion of the desired data is retrieved from the server storage system.

Figure 7B:
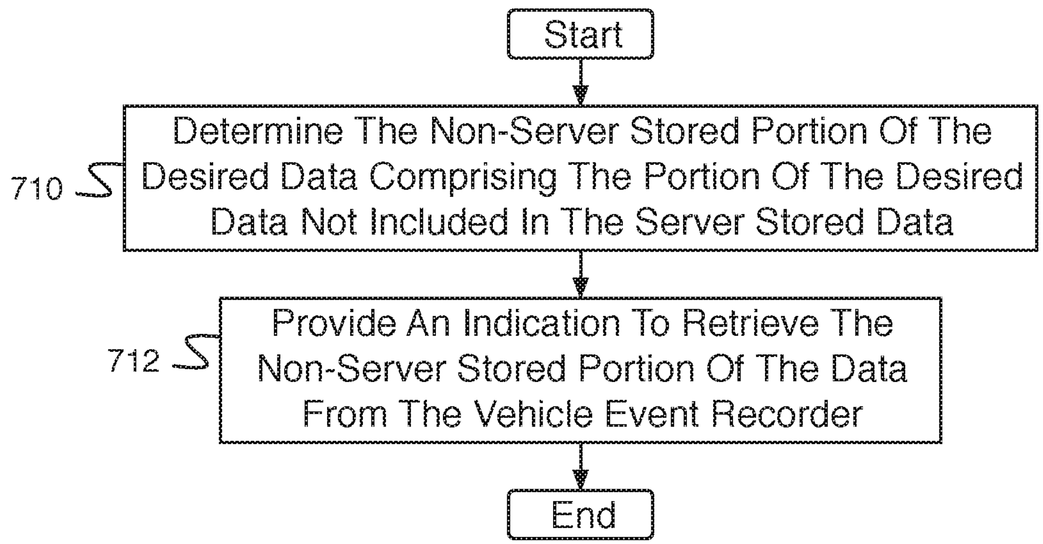
FIG. 7B is a flow diagram illustrating an embodiment of a process for determining a non-server stored portion of a desired data without using information stored in a global index.

FIG. 7B is a flow diagram illustrating an embodiment of a process for determining a non-server stored portion of a desired data without using information stored in a global index. In some embodiments, the process of FIG. 7B implements 510 of FIG. 5. In the example shown, in 710, the non-server stored portion of the desired data comprising the portion of the desired data not included in the server stored data is determined. For example, the non-server stored portion of the desired data is determined by removing data elements of the server stored portion of the desired data from a listing of elements of the desired data. In 712, an indication is provided to retrieve the non-server stored portion of the data from the vehicle event recorder.

Figure 7C:
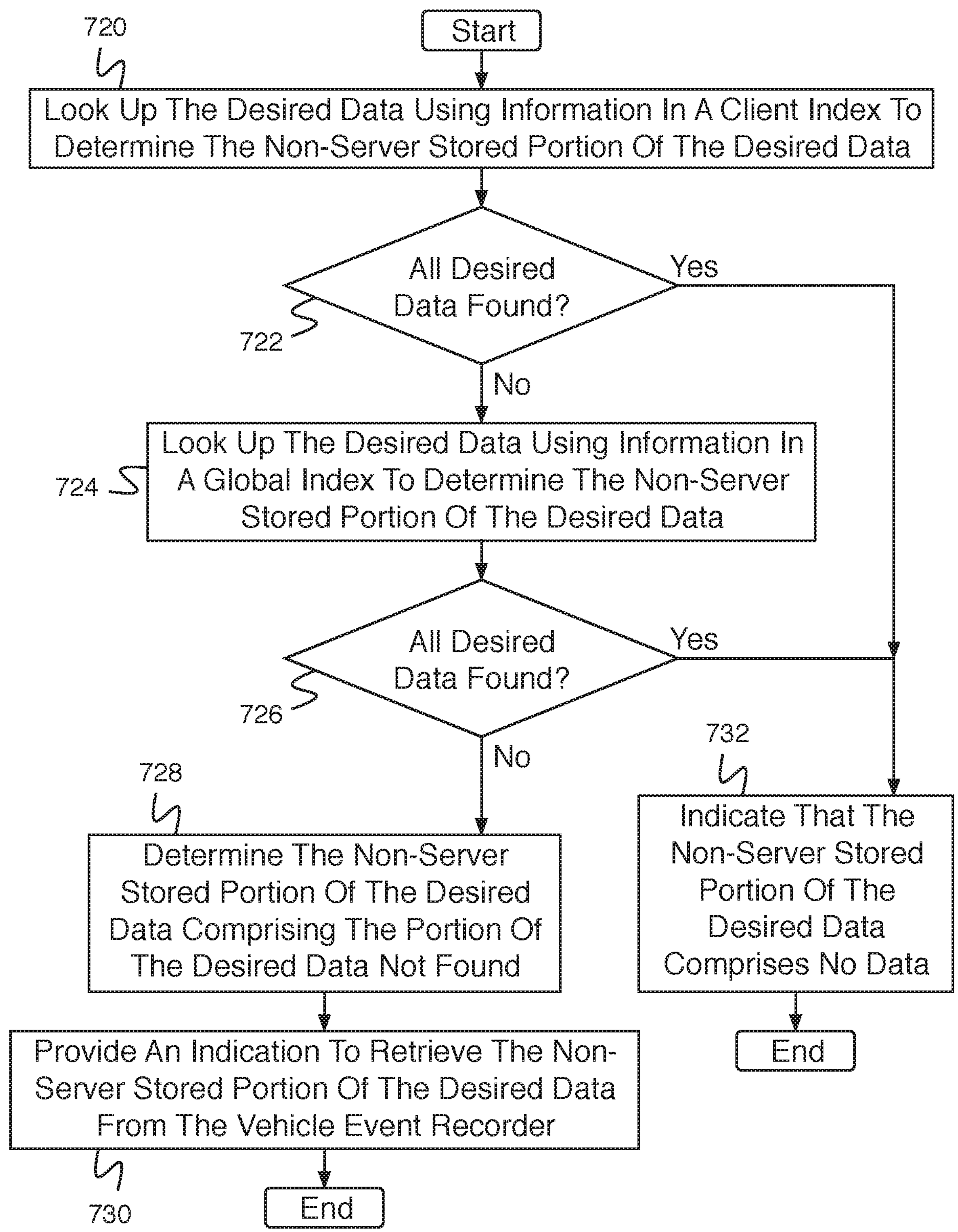
FIG. 7C is a flow diagram illustrating an embodiment of a process for determining a non-server stored portion of a desired data using information stored in a global index.

FIG. 7C is a flow diagram illustrating an embodiment of a process for determining a non-server stored portion of a desired data using information stored in a global index. In some embodiments, the process of FIG. 7C implements 510 of FIG. 5. In the example shown, in 720, the desired data is looked up using information in a client index to determine the non-server stored portion of the desired data. In 722, it is determined whether all the desired data was found (e.g., in the client index). In the event it is determined that the desired data was found, control passes to 732. In the event it is determined that the desired data was not found, control passes to 724. In some embodiments, in the event it is determined that some of the data was not found, control passes to 724. In 724, the desired data is looked up using information in a global index to determine the non-server stored portion of the desired data. In 726, it is determined whether all the desired data was found (e.g., in the global index). In the event it is determined that the desired data was found, control passes to 732. In the event it is determined that the desired data was not found, control passes to 728. In some embodiments, in the event it is determined that some of the desired data was not found, control passes to 728. In 728, the non-server portion of the desired data comprising the portion of the desired data not found is determined. In 730, an indication is provided to retrieve the non-server stored portion of the desired data from the vehicle event recorder, and the process ends. In 732, the process indicates that the non-server stored portion of the desired data comprises no data.

Figure 8A:
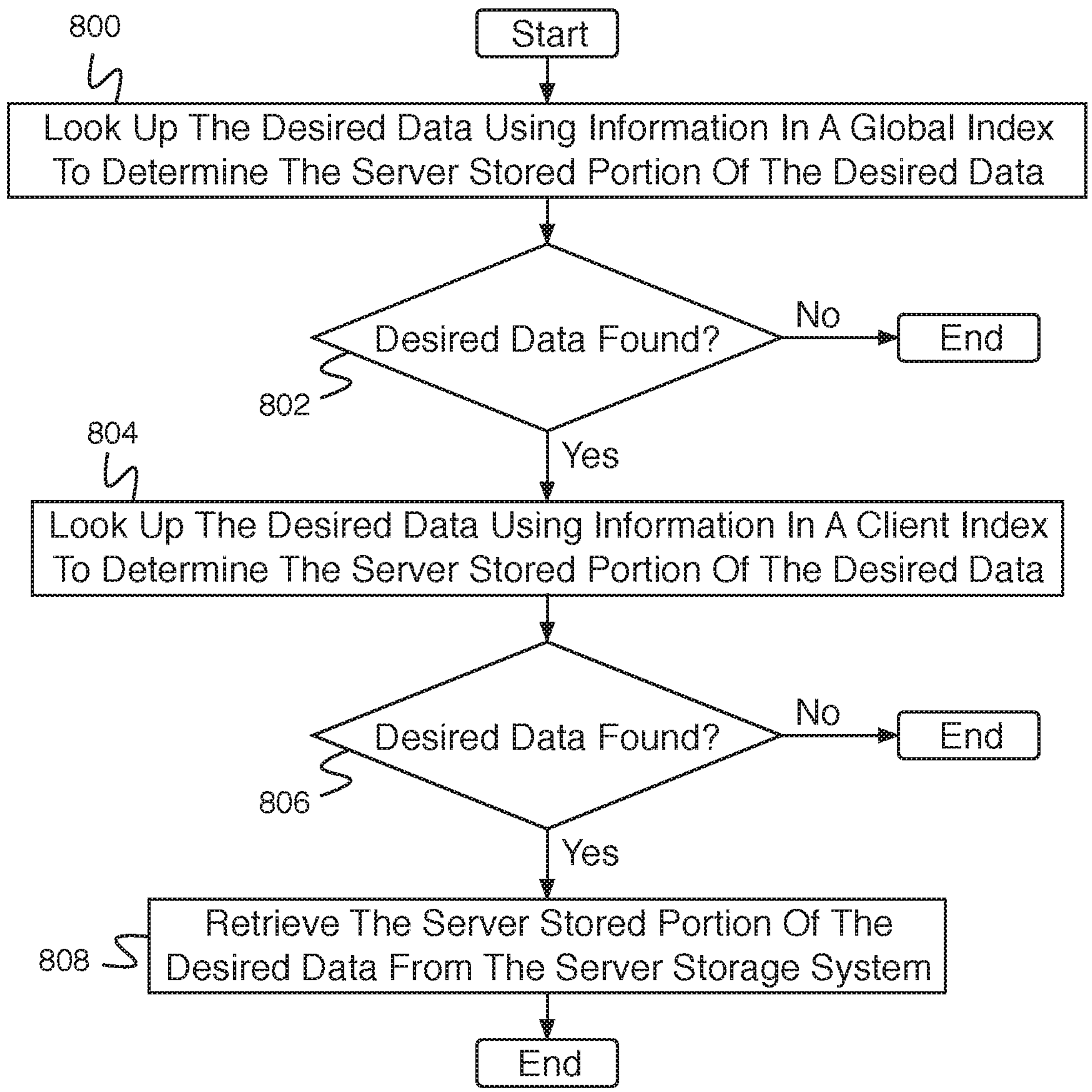
FIG. 8A is a flow diagram illustrating an embodiment of a process for determining a server stored portion of a desired data.

FIG. 8A is a flow diagram illustrating an embodiment of a process for determining a server stored portion of a desired data. In some embodiments, the process of FIG. 8 implements 508 of FIG. 5. In the example shown, in 800, data is looked up using information in a global index. For example, the global index comprises all transferred data. In 802, it is determined whether the data was found (e.g., in the global index). In the event the data was not found, the process ends. In the event the data was found, control passes to 804. In 804, the data is looked up using information in a client index. For example, the client index comprises all data accessible to users associated with the client.

Figure 8B:
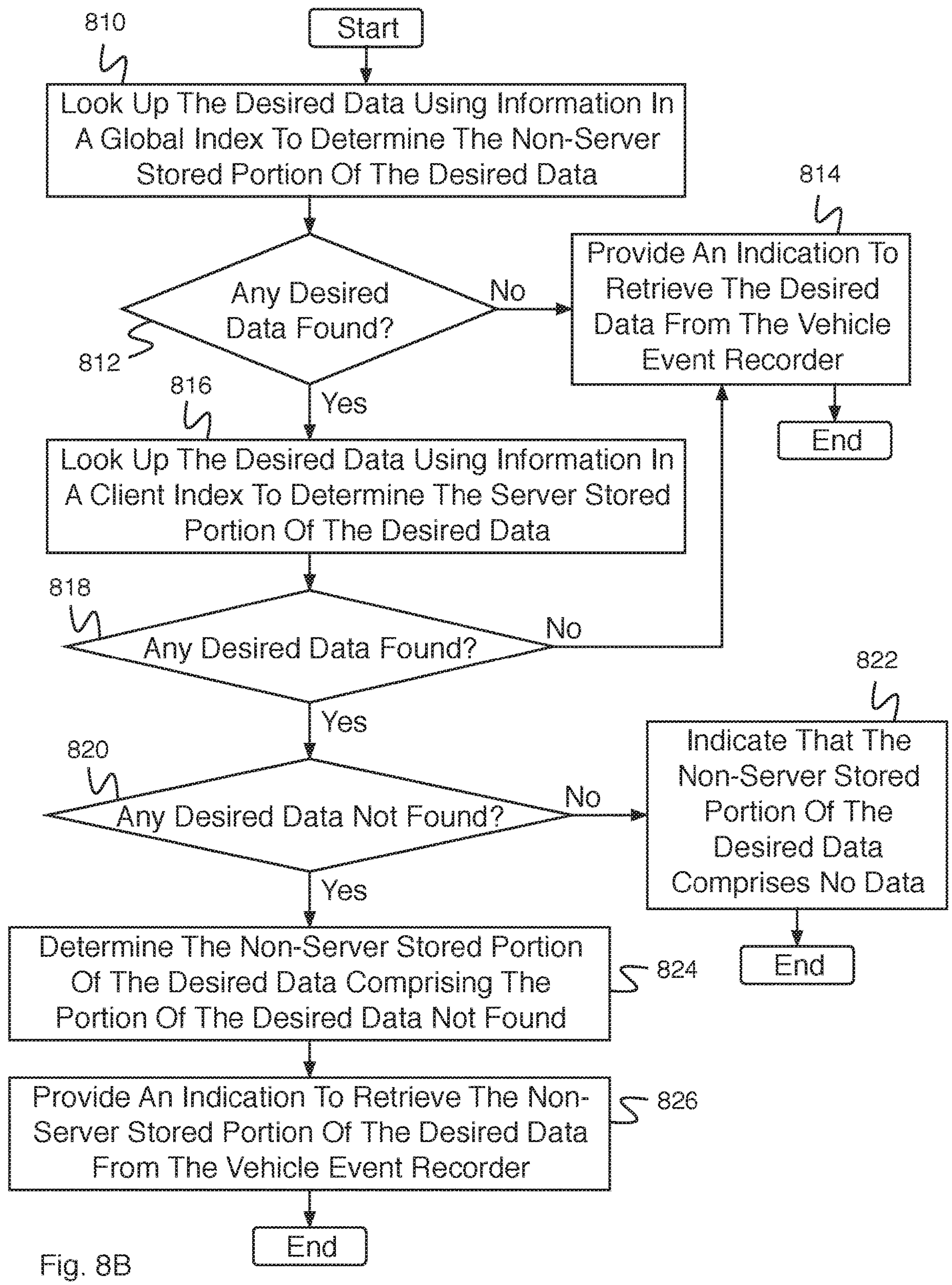
FIG. 8B is a flow diagram illustrating an embodiment of a process for determining a non-stored portion of a desired data using information stored in a global index.

FIG. 8B is a flow diagram illustrating an embodiment of a process for determining a non-stored portion of a desired data using information stored in a global index. In some embodiments, a non-stored portion of a desired data is determined without using information stored in a global index (e.g., using the process of FIG. 7B). In the example shown, in 810, the desired data is looked up using information in a global index to determine the non-server stored portion of the desired data. In 812, it is determined whether any of the desired data is found (e.g., found in the global index). In the event it is determined that any of the desired data is not found in the global index, control passes to 814. In 814, an indication is provided to retrieve the desired data from the vehicle event recorder (e.g., it is determined that the non-server stored portion of the desired data comprises all of the desired data). The process then ends. In the event it is determined in 812 that any of the desired data is found in the global index, control passes to 816. In 816, the desired data is looked up using information in a client index to determine the non-server stored portion of the desired data. For example, the client index comprises all data accessible to users associated with the client. In 818, it is determined whether any of the desired data is found (e.g., found in the client index). In the event it is determined that any of the desired data is not found in the client index, control passes to 814. In the event it is determined that any of the desired data is found in the client index, control passes to 820. In 820, it is determined whether any of the desired data is not found. In the event it is determined to not be the case that any of the desired data is not found (e.g., all of the desired data is found in the client index), control passes to 822. In 822, the process indicates that the non-server stored portion of the desired data comprises no data, and the process ends. In 820, in the event it is determined that any of the desired data is not found, control passes to 824. In 824, the non-server stored portion of the desired data comprising the portion of the desired data not found is determined. In 826, an indication is provided to retrieve the non-server stored portion of the desired data from the vehicle event recorder.

Figure 9A:
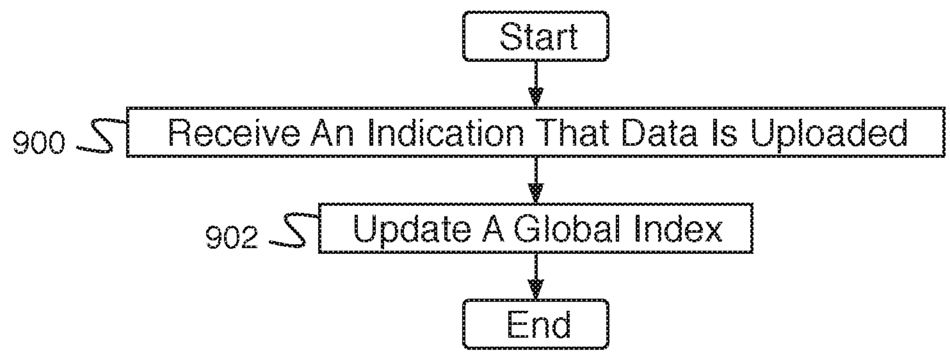
FIG. 9A is a flow diagram illustrating an embodiment of a process for updating a global index.

FIG. 9A is a flow diagram illustrating an embodiment of a process for updating a global index. In some embodiments, the process of FIG. 9A is executed by vehicle data center 104 of FIG. 1. For example, the process of FIG. 9A is executed in response to a data receipt. In 900, an indication is received that data is uploaded. In 902, a global index is updated.

Figure 9B:
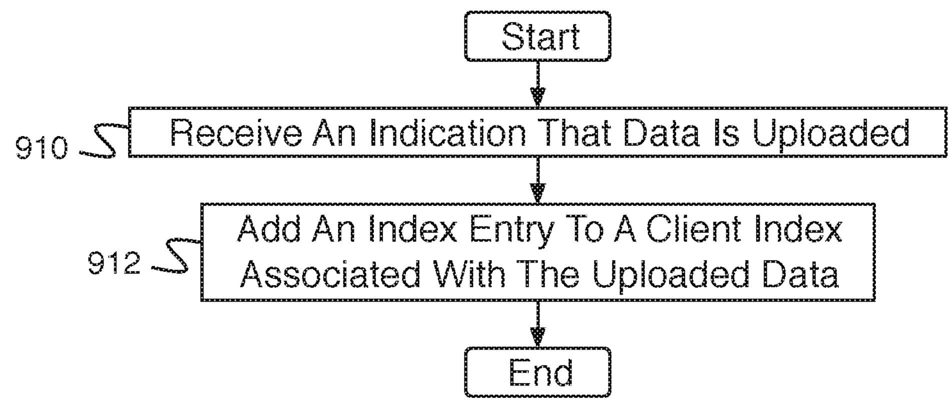
FIG. 9B is a flow diagram illustrating an embodiment of a process for updating a client index.

FIG. 9B is a flow diagram illustrating an embodiment of a process for updating a client index. In some embodiments, the process of FIG. 9B is executed by vehicle data center 104 of FIG. 1. For example, the process of FIG. 9B is executed in response to a data receipt. In 910, an indication is received that data is uploaded. In 912, an index entry associated with the uploaded data is added to a client index.

Figure 9C:
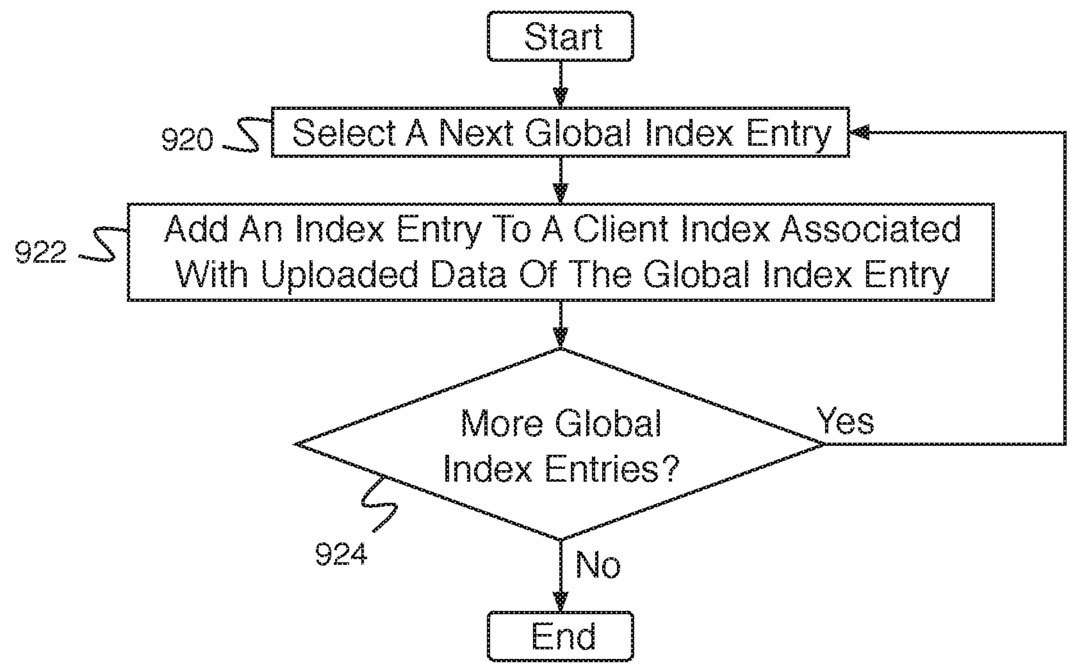
FIG. 9C is a flow diagram illustrating an embodiment of a process for updating a client index.

FIG. 9C is a flow diagram illustrating an embodiment of a process for updating a client index. In some embodiments, the process of FIG. 9C is executed by vehicle data center 104 of FIG. 1. In the example shown, in 920, a next global index entry is selected. In 922, an index entry is added to a client index associated with uploaded data of the global index entry. In 924, it is determined whether there are more global index entries. In the event it is determined that there are more global index entries, control passes to 920. In the event it is determined that there are not more global index entries, the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for data access, comprising:

a server storage system, wherein the server storage system stores data associated with a plurality of vehicle event recorders;

a global index, wherein the global index includes indications of server-stored data stored on the server storage system and corresponding client information, wherein the client information includes an associated indication that the server-stored data is associated with a client of a plurality of clients;

a client index comprising a plurality of client indices with an index associated with each client, wherein a first client index includes a subset of the indications of the global index corresponding to data associated with the first client;

an interface configured to:

receive an access indication to access desired data associated with a vehicle event recorder of the plurality of vehicle event recorders, wherein the vehicle event recorder is associated with a specific client; and a processor configured to:

determine a server stored portion of the desired data associated with the vehicle event recorder that has been previously stored on the server storage system using information stored in the global index;

retrieve the server stored portion of the data from the server storage system; and determine a non-server stored portion of the desired data associated with the vehicle event recorder that has not been previously stored on the server storage system, comprising to:

look up the desired data using information in the client index to determine the non-server stored portion of the desired data;

determine whether all of the desired data was found in the client index; and in response to a determination that all of the desired data was not found in the client index:

look up the desired data using information in the global index to determine the non-server stored portion of the desired data;

determine whether all of the desired data was found in the global index; and in response to a determination that all of the desired data was not found in the global index, indicate to retrieve the non-server stored portion of the data from the vehicle event recorder.

2. The system of claim 1, wherein the server stored portion of the desired data and the non-server stored portion of the desired data are interleaved to provide access to the desired data.

3. The system of claim 1, wherein determining the server stored portion comprises accessing the global index.

4. The system of claim 1, wherein the global index is updated when data is loaded from the vehicle event recorder.

5. The system of claim 4, wherein the global index is updated when data is livestreamed and stored from the vehicle event recorder.

6. The system of claim 4, wherein the global index is updated when data is accessed for research purposes.

7. The system of claim 1, wherein determining the server stored portion comprises accessing the client index, wherein the client index is updated using information in the global index.

8. The system of claim 1, wherein determining the server stored portion comprises accessing the client index then accessing the global index.

9. The system of claim 1, wherein determining the server stored portion comprises accessing the global index then accessing the client index.

10. The system of claim 1, wherein the server-stored data stored on the server storage system comprises data type data.

11. The system of claim 1, wherein the server-stored data stored on the server storage system comprises starting date and time data.

12. The system of claim 1, wherein the server-stored data stored on the server storage system comprises ending date and time data.

13. The system of claim 1, wherein the server-stored data stored on the server storage system comprises data length data.

14. The system of claim 1, wherein the server-stored data stored on the server storage system comprises data sample rate data.

15. The system of claim 1, wherein the server-stored data stored on the server storage system comprises vehicle event recorder identifier data.

16. The system of claim 1, wherein the server-stored data stored on the server storage system comprises vehicle identifier data.

17. The system of claim 1, wherein the server-stored data stored on the server storage system comprises client identifier data.

18. The system of claim 1, wherein the server-stored data stored on the server storage system comprises video data, audio data, accelerometer data, global positioning system data, braking data, ignition status data, or OBD-II fault code data.

19. A method for data access, comprising:

storing data associated with a plurality of vehicle event recorders using a server storage system;

including indications of server-stored data stored on the server storage system and corresponding client information in a global index, wherein the client information includes an indication that the stored data is associated with a client of a plurality of clients;

receiving, using an interface, an indication to access desired data associated with a vehicle event recorder of the plurality of vehicle event recorders, wherein the vehicle event recorder is associated with a specific client;

determining, using a processor, a server stored portion of the desired data associated with the vehicle event recorder that has been previously stored on the server storage system using information stored in the global index;

retrieving the server stored portion of the data from the server storage system; and determining a non-server stored portion of the desired data associated with the vehicle event recorder that has not been previously stored on the server storage system using information stored in the global index and index, comprising:

looking up the desired data using information in a client index to determine the non-server stored portion of the desired data, wherein the client index comprises a plurality of client indices with an index associated with each client, wherein a first client index includes a subset of the indications of the global index corresponding to data associated with the first client;

determining whether all of the desired data was found in the client index; and in response to a determination that all of the desired data was not found in the client index:

looking up the desired data using information in the global index to determine the non-server stored portion of the desired data, wherein the global index includes indications of server-stored data stored on the server storage system and corresponding client information, wherein the client information includes an associated indication that the server-stored data is associated with a client of a plurality of clients;

determining whether all of the desired data was found in the global index; and in response to a determination that all of the desired data was not found in the global index, indicating to retrieve the non-server stored portion of the data from the vehicle event recorder.

20. A computer program product for data access, the computer program product being embodied in a tangible non-transitory computer readable storage medium and comprising computer instructions for:

storing data associated with a plurality of vehicle event recorders using a server storage system;

including indications of server-stored data stored on the server storage system and corresponding client information in a global index, wherein the client information includes an indication that the stored data is associated with a client of a plurality of clients;

receiving, using an interface, an indication to access desired data associated with a vehicle event recorder of the plurality of vehicle event recorders, wherein the vehicle event recorder is associated with a specific client;

determining, using a processor, a server stored portion of the desired data associated with the vehicle event recorder that has been previously stored on the server storage system using information stored in the global index;

retrieving the server stored portion of the data from the server storage system; and determining a non-server stored portion of the desired data associated with the vehicle event recorder that has not been previously stored on the server storage system using information stored in the global index, comprising:

looking up the desired data using information in a client index to determine the non-server stored portion of the desired data, wherein the client index comprises a plurality of client indices with an index associated with each client, wherein a first client index includes a subset of the indications of the global index corresponding to data associated with the first client;

determining whether all of the desired data was found in the client index; and in response to a determination that all of the desired data was not found in the client index:

looking up the desired data using information in the global index to determine the non-server stored portion of the desired data, wherein the global index includes indications of server-stored data stored on the server storage system and corresponding client information, wherein the client information includes an associated indication that the server-stored data is associated with a client of a plurality of clients;

determining whether all of the desired data was found in the global index; and in response to a determination that all of the desired data was not found in the global index, indicating to retrieve the non-server stored portion of the data from the vehicle event recorder.

* * * * *

UNITED STATES PATENT AND TRADEMARK OFFICE
CERTIFICATE OF CORRECTION

PATENT NO. : 11,032,372 B1
APPLICATION NO. : 16/600818
DATED : June 8, 2021
INVENTOR(S) : Jeremiah Todd Wittevrongel It is certified that error appears in the above-identified patent and that said Letters Patent is hereby corrected as shown below:

In the Claims

In Column 13, Line(s) 2, Claim 19, after “global”, delete “index and”.

Signed and Sealed this
Nineteenth Day of April, 2022

Katherine Kelly Vidal

Katherine Kelly Vidal
*Director of the United States Patent and Trademark Office*